W. D. BAUGHN.
CHURNING AND WORKING BUTTER.
No. 66,445. Patented July 9, 1867.
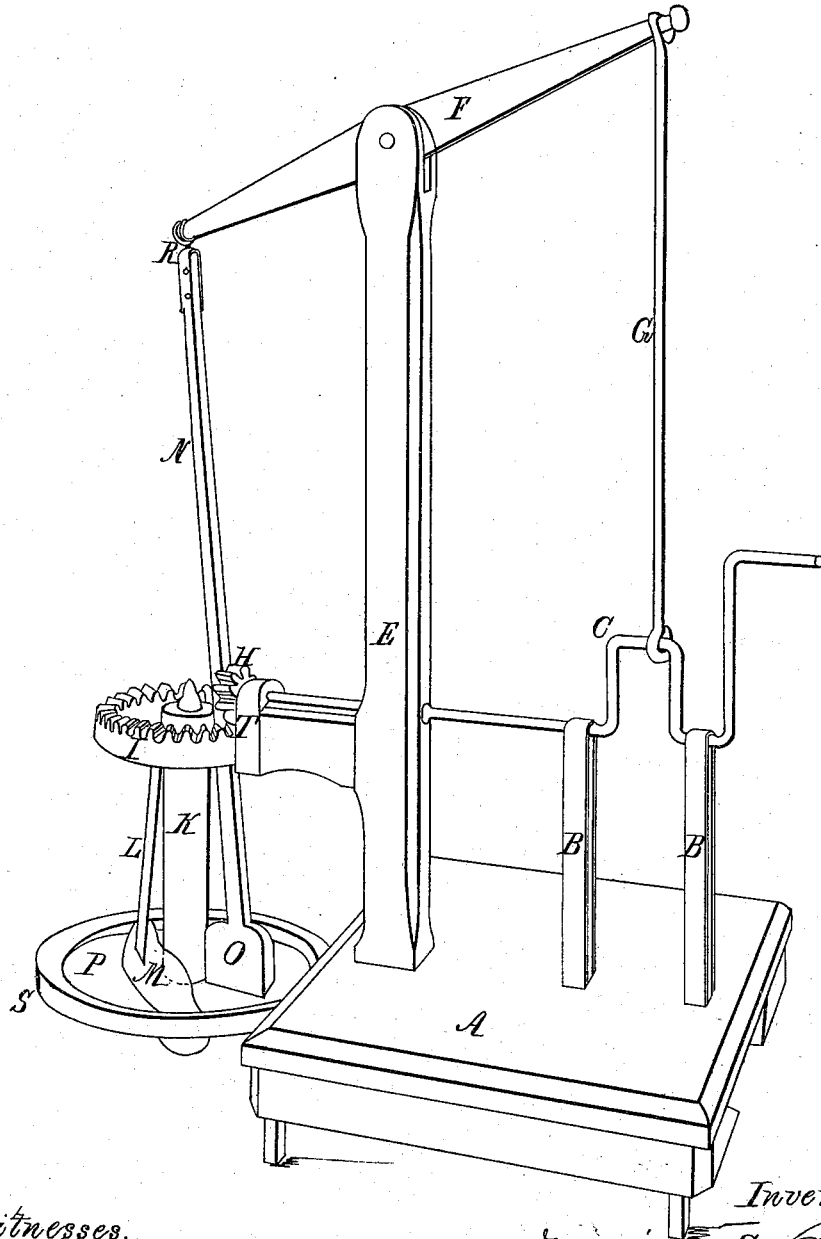
Witnesses.
H. F. Ebert.
Chas. Atwood
Inventor.
William D. Baughn
by his Attorney.
Thos. S. Sprague

United States Patent Office.

WILLIAM D. BAUGHN, OF MILFORD, MICHIGAN.

Letters Patent No. 66,445, dated July 9, 1867.

---

IMPROVEMENT IN CHURNING AND WORKING BUTTER.

---

The Schedule referred to in these Letters Patent and making part of the same.

---

Be it known that I, WILLIAM D. BAUGHN, of Milford, in the county of Oakland, in the State of Michigan, have invented a new Machine for Churning and Gathering Butter; and I do declare that the following is an accurate description thereof, reference being had to the accompanying drawings, and to the letters of reference marked thereon, making part of this specification.

The nature of my invention consists in using the platform A, upon which I erect standards B B, to hold the shaft and crank C. I also erect the standard E, with working-beam F, attached to crank C by the arm G. Upon the end of the shaft C I place a pinion, H, which meshes into crown-wheel I, which is placed upon the standard K, and revolves upon it, supported by the rest or box T. To the under side of the crown-wheel I I attach the connecting-rod L, which carries the plough or scraper M, constantly throwing the butter to be worked and gathered into the centre, around the standard K. To the outer end of the working-beam F I attach the rod N, with a revolving joint, R. The rod passes through a slot in the crown-wheel I, and carries the beater O, which works the butter upon the plate P. The buttermilk passes off through the aperture S. When I wish to churn butter simply, I disconnect the rod N at the revolving joint R, and pull out the plate P, when I can attach any churn for the purpose specified.

What I claim as my invention, and desire to secure by Letters Patent, is—

The arrangement and combination of the plough or scraper M, the cog-wheel I, the standard K, the rod N and the beater O, all arranged substantially as described for the purpose designed.

WILLIAM D. BAUGHN.

Witnesses:
H. F. EBERTS,
CHARLES ATWOOD.